G. L. COCHIUS.
WEIGHING MACHINE.
APPLICATION FILED MAR. 19, 1909.

944,847.

Patented Dec. 28, 1909.
2 SHEETS—SHEET 1.

Witnesses

Inventor
Gerard L. Cochius
By
James L. Norris
Attorney

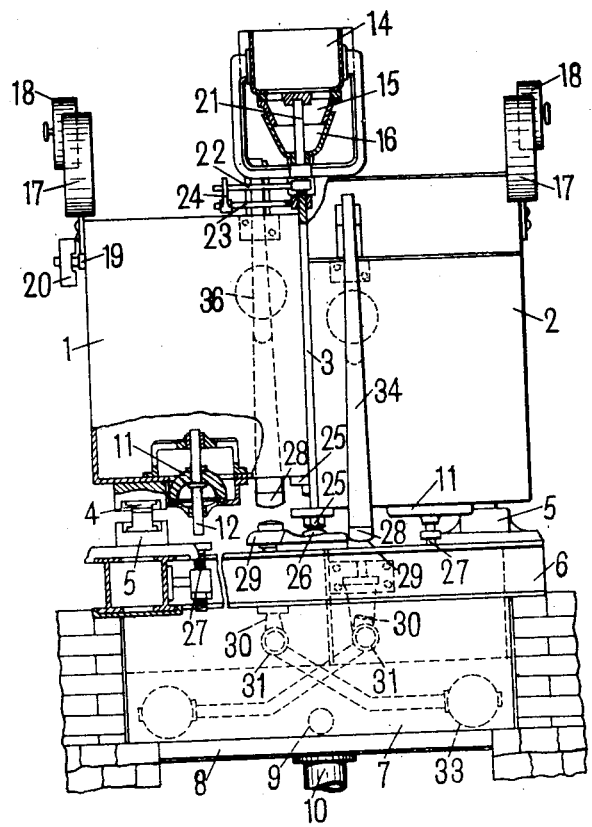
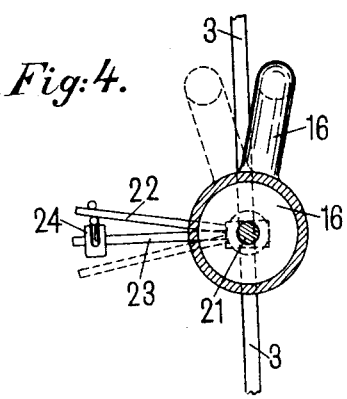

UNITED STATES PATENT OFFICE.

GERARD LOUIS COCHIUS, OF REMBOEN, JAVA, ASSIGNOR TO MAATSCHAPPY TOT VOORTZETTING VAN DE ZAKEN DER FIRMA RUHAAK & CO., OF HAARLEM, NETHERLANDS.

WEIGHING-MACHINE.

944,847. Specification of Letters Patent. Patented Dec. 28, 1909.

Application filed March 19, 1909. Serial No. 484,513.

*To all whom it may concern:*

Be it known that I, GERARD LOUIS CO-CHIUS, manufacturer, subject of the Queen of the Netherlands, residing at Remboen, Residency of Koedoe, Java, Dutch East Indies, have invented certain new and useful Improvements in Weighing-Machines, of which the following is a specification.

This invention relates to automatic weighing machines for liquids, comprising two weighing vessels and mechanism adapted to indicate the number of weighing operations so that the machine is also self-registering. Ordinary constructions of machines of this type are not satisfactory in that equal quantities of liquid can never be obtained at every weighing operation therewith as the swing or tilt of the weighing vessels is prejudicially influenced by friction of the pivots, and friction at the various fulcra of the levers and rollers or chains employed so that at one time a vessel swings or tilts over somewhat later than at a previous weighing operation and so on. This is more likely to take place in that the weighing machine mechanism has to operate other mechanisms, such for example, as the counter. These and other disadvantages that exist in ordinary automatic weighing machines of this type are obviated in a weighing machine according to the present invention. In the improved machine the two vessels are of equal size and of similar shape, are arranged side by side at an incline one to the other, and the central axes of such vessels are out of phase. The two vessels are so arranged that when the one vessel is receiving liquid it is horizontal and the other vessel is then in an inclined position so that the liquid can conveniently flow away therefrom, and vice versa. The structure comprising the two vessels is mounted to rock on steel knife edges upon corresponding planes fixed in the frame or base of the machine and the said structure is very accurately counterbalanced by means of weights so that only extremely small frictional resistances arise when tilting over takes place and great accuracy of measurement is thereby attained. The counter or indicating mechanism is not operated by the tilting structure itself but by the liquid which has flowed away from the vessels thereof.

An example of a constructional form of weighing machine embodying this invention is shown in the accompanying drawings.

Figure 1:
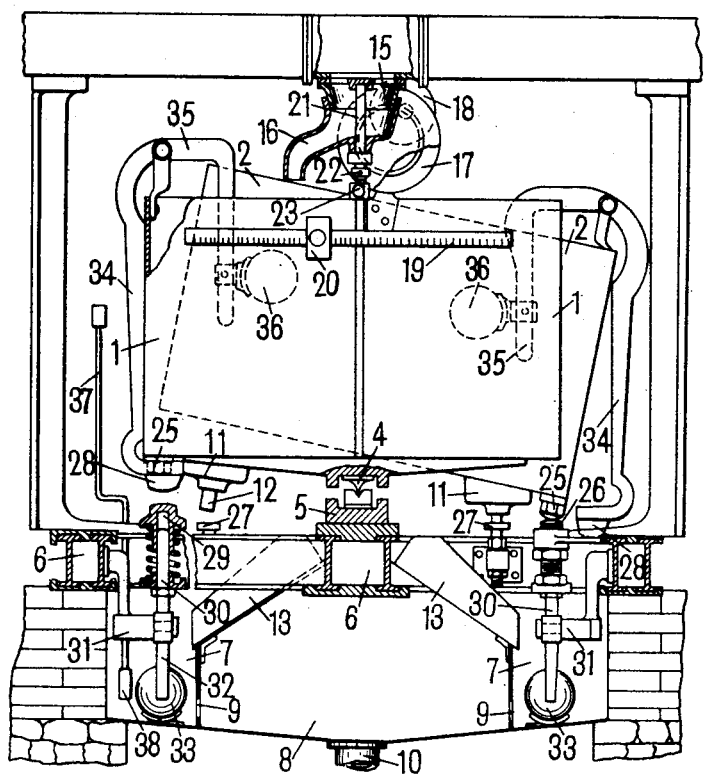
Figure 2:
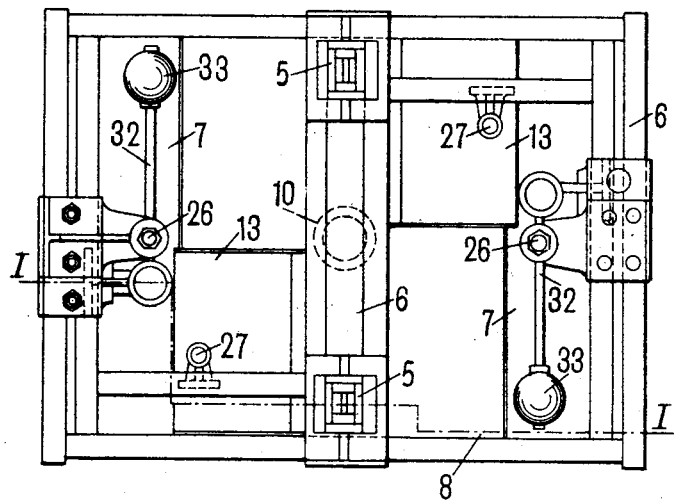

Figure 1 shows the machine partly in front elevation and partly in section corresponding to the line I—I of Fig. 2. Fig. 2 is a plan of the frame constituting the base of the machine. Fig. 3 shows the machine partly in side elevation and partly in section. Fig. 4 is a detail view showing the liquid delivery spout and its operating mechanism, to a larger scale.

The improved weighing machine illustrated comprises two weighing vessels 1 and 2 arranged side by side at such an angle to each other that when one is horizontal the other is slightly tilted, 3 being a common central wall that separates the vessels from each other. The vessels are carried on hardened steel knife edges 4 fixed to planes 5 upon transverse members of a metal framework 6 constituting the base of the machine. At each side of such base and within the frame 6 is arranged a receiving tank 7, the two tanks freely communicating through outlet openings 9 with a common centrally arranged collecting vessel 8 from which the weighed liquid can flow away through a pipe 10.

The bottom of each of the vessels 1 and 2 is furnished with a valve 11 which is connected to or formed in one with a downwardly extending spindle 12 that projects below the bottom of the vessel. The valves are inclined to the bottom of the vessels and below them are placed gutters 13 which deliver into the receiving tanks 7.

14 is a liquid supply gutter located above the vessels and from which liquid can flow into either of the two vessels through an outlet branch 15 and a spout 16 which is mounted to rotate.

The center line of the knife edges 4 about which the vessels rock is not midway between the opposite walls of the vessels, which extend parallel therewith, but is to one side of such mid position, for example the center line of each vessel in the construction illustrated, lies 2½ cm. (two and one half centimeters) to one side of the center line of support so that in each vessel one part is 5 cm. (five centimeters) longer than the other. Considering the two vessels together it will be seen that although the line of support in reality lies in the center of the structure comprising the two, yet on each side of such center line of support one vessel projects 5 cm. (five centimeters) beyond the other vessel. When either vessel is charged there will therefore be on the side which is 5 cm. (five centimeters) longer a greater weight of liquid than on the other side. The arrangement is such that each vessel in turn is caused to assume a horizontal position when it has received its charge of liquid, and, in order to compensate the extra weight of liquid on the one side of the vessel, weights 17 are so arranged at the front and rear of the structure comprising the two vessels that a vertical center line dividing such structure into two parts of equal weight coincides with a line drawn from the points of the knife edges 4 through the centers of the weights 17, see Fig. 1. It will thus be seen that the weights 17 consequently always lie on the shorter side of the vessel in position to receive liquid and that in order for such vessel to tilt over it must first assume a position in which its walls are vertical and its bottom horizontal. For the sake of clearness only part of the weight 17 on the front vessel 1 is shown in Fig. 1.

For the purpose of enabling the extra weight of liquid to be accurately compensated at the instant of the tilting over of a charged vessel, small adjusting weights 18 are connected to the weights 17, see Figs. 1 and 3; by suitable adjustment of these weights the vessels instantly tilt over after having been filled with a definite weight of liquid. Furthermore for the purpose of enabling the center of gravity of the structure comprising the two vessels to be accurately adjusted over the line of support there is arranged on one side of the structure a weight 20 adapted to slide along a scale 19.

As stated it is the vessel which is in an approximately horizontal position that is supplied with liquid so that the liquid delivery spout 16 must be turned alternately from the one vessel which has received the desired quantity of liquid and has tilted, to the other which is empty. For this purpose the spout 16 is mounted upon a vertically rotating shaft 21 which has fixed upon it an arm or lever 22 the free end of which is embraced by a fork 24 fixed on an arm 23 that is rigidly secured to the common partition or wall 3. The arrangement is such, as will be seen, that as either vessel tilts the fork 24 of the arm 23 moves the spout 16, through the shaft 21, from its position over the one vessel, across the partition or wall 3, into proper position over the other which is then in position for receiving liquid, so that liquid is automatically prevented from flowing into the emptying vessel after such vessel has tilted over.

The horizontal position of the vessel which is being filled is controlled by the inclined position of the other vessel and to enable accurate adjustment each vessel is furnished with a stop 25 on its under side adapted, when the vessel tilts, to rest on the upper end of adjustable bolts 26 carried by a suitable part of the machine base frame 6, such bolts forming at each side a third point of support for the vessels, for which reason the stops 25 are fixed near to the outer side of the vessels exactly under the common central partition or wall 3.

For the purpose of opening the valves 11 when the vessels tilt over the valve spindles 12 project downwardly and upon the base frame 6 are arranged adjustable stops 27 on which the valve spindles 12 rest so as to open the valves when the vessels are in their inclined or discharging positions. In the inclined positions of the vessels the valves are in a horizontal position which is most favorable for allowing the contents of the vessels to flow through. Immediately the vessels return to the horizontal positions again after being emptied, the valves close again by their own weight.

To prevent a full vessel striking with its entire weight upon the stop bolts 26 when tilted over which would in a short time so damage these bolts and the stops 25 that the accurate horizontal position of the other vessel would be affected, and in order to soften the shock on the valve spindles 12 when striking the stops 27, buffer arrangements are provided upon which the vessels first strike when tilted. In the example shown each buffer arrangement comprises a hardened stop 28 located beneath the bottom of the corresponding vessel when such vessel is in its horizontal position or containing liquid and a buffer head 29 in the path of such stop and which is elastically supported upon the vertical arm 30 of a two armed lever which is mounted to rotate upon a fixed pin 31 that is located in the corresponding receiving tank 7. The other arm 32 of the two armed lever is provided with a float 33 in such a way that in the normal position the float lies upon the bottom of the tank 7 and the arm 30 is vertical so that when the corresponding vessel tilts over the blow is taken up elastically by the buffer head 29 and, through the lever arm 30, by the pin 31. The stop 28 is carried by the bent end of the downwardly extending arm of a lever 34 pivoted to the corresponding vessel and the other arm of which lever is extended downwardly into the corresponding vessel and is provided at its lower end with an adjustable float 36. The arrangement is such that when either vessel, for example the vessel 2 in Fig. 1, is in an inclined position and is partially emptied, the lever 34 is moved away from the vessel by the weight of the float 36, as shown in Fig. 1, and the stop 28 is consequently drawn away from under the vessel. When a vessel, having assumed the horizontal position, is supplied with liquid, the liquid rises to the float 36 and lifts it, the stop 28 is then again moved under the vessel as shown on the left hand side of Fig. 1, by the consequent partial rotation of the lever 34. This takes place shortly before the tilting over of the completely filled vessel.

The weighing machine is furnished with a registering apparatus comprising a vertically guided pusher rod 37 for each receiving tank 7, the lower end of which extends into the corresponding tank 7 and is there provided with a float 38, see Fig. 1, while the upper end is connected in the usual way with a counting mechanism adapted to register each time the tank 7 receives liquid.

The action of the improved weighing machine is as follows:—Assuming the parts to be in the positions shown in Fig. 1, after the vessel 1 has been almost completely filled with liquid from the spout 16 which is over it and after the projection 28 has been moved beneath it by the raising of the float 36 therein and the consequent movement of the lever 34, this vessel will tilt over as soon as the overweight of liquid on the left hand side, see Fig. 1, is no longer compensated by the counter-weight 17, the valve 11 thereof will thereupon be opened by the impact of the valve spindle 12 against the stop 27 and the vessel 1 will be emptied through the gutter 13 into the corresponding receiving tank 7. At the same time the stop 28 has come into contact with the buffer head 29 and movement of the vessel 1 has been elastically cushioned thereby, while, owing to the vertical position of the lever arm 30, the weight of the vessel 1 is carried by the pin 31. Liquid flows from the tank 7 through the opening 9 in the collecting vessel 8; the cross sectional area of the opening is however but half that of the opening controlled by the valve 11 so that the liquid will notwithstanding gradually rise in the tank 7 and the float 33 will be raised by the rising liquid. The result of this is that the lever arm 30 is pushed to one side, that is to say to the left, see Fig. 3, and is therefore moved away from under the stop 28. To facilitate this movement the impact faces of both stop and buffer head are made partly spherical. The vessel 1 can now completely tilt over and finally the stop 25 will come quite gently into contact with the bolt 26. The valve 11 will also be still further raised by the lower position so that the vessel is now emptied still more quickly. In the meantime the level of the liquid in the vessel 1 has sunk to such an extent that the float 36 has become free so that the lever 34 will be rotated toward the left by its own weight, see Fig. 1, whereby the projection 28 will be moved outwardly from under the vessel 1 and assume the position relatively thereto shown on the right hand side of Fig. 1. Since, as hereinbefore stated, the cross sectional area of the opening 9 is but half that of the opening controlled by the valve 11, the tank 7 will take twice the time to empty as the vessel 1 so that during the time in which the vessel 2 is being filled the receiving tank 7 of the vessel 1 is gradually emptying, finally the float 33 sinks down again and the lever arm 30 again returns to its vertical position ready to take up the shock of the vessel subsequently tilted over onto it. This movement of the buffer head 29 is completed while the vessel 1 is still in its lowest inclined position and the lever arm 30 can assume its vertical position without hindrance and without the buffer head 29 coming into contact with the bottom of the vessel, the stop 28 having in the meantime been moved from under the vessel as hereinbefore described. The liquid delivery spout 16 is moved over the vessel 2 by the tilting over of the vessel 1 as hereinbefore set forth so that while the vessel 1 is emptying the vessel 2 is being filled during which operation it gradually assumes the horizontal position. At the same time as the liquid rises the float 36 is raised and the stop 28 on this side is moved under the vessel 2. This vessel is now ready to tilt over and in doing so its stop 28 strikes against the buffer head 29 for the purpose of taking up the shock, as just described with reference to the vessel 1.

It will be seen that the stops 28 and the buffer heads 29 are always caused to assume the right positions in order to take up the shock when the vessels are tilted over and are removed from these positions the instant the vessel has to swing farther over in order to take up its lowest position upon the adjustable stop bolt 26 and that at the same time, the stops 25 strike quite gently against the bolts 26 which is necessary for the maintenance of the accurate horizontal position of the vessel being filled. Inasmuch as therefore the vessels 1 and 2 are alternately supplied with accurately similar quantities of liquid, tilted over, and emptied, and as the number of these emptying operations is registered, the improved weighing machine supplies a measuring apparatus for liquids, of a precision which it is believed has never existed heretofore in such type of weighing machines.

What I claim is:—

1. In a weighing machine for liquids, a structure comprising two weighing vessels arranged side by side but displaced laterally in relation to each other so that the central or gravity axes do not lie in the same vertical plane but are located at opposite sides of the central or gravity axis of said structure and the bottoms of which vessels are at an angle to each other, a machine support, knife edges carried by said support on which said structure can rock, said knife edges being located in the central or gravity axis of said structure, means for supplying the weighing vessels of said structure with liquid alternately, and means for alternately emptying the vessels of said structure at the completion of each weighing operation.

2. In a weighing machine, for liquids, a structure comprising two weighing vessels arranged side by side but displaced laterally in relation to each other so that the central or gravity axes do not lie in the same vertical plane but are located at opposite sides of the central or gravity axis of said structure and the bottoms of which vessels are at an angle to each other, a machine support, knife edges carried by said support on which said structure can rock, said knife edges being located in the central or gravity axis of said structure, means adapted to counterbalance the additional weight of that part of each vessel of said structure which projects farthest over said knife edges, means for supplying the weighing vessels of said structure with liquid alternately, and means for alternately emptying the vessels of said structure at the completion of each weighing operation.

3. In a weighing machine for liquids, a structure comprising two weighing vessels arranged side by side with a common partition wall between them but displaced laterally in relation to each other so that the central or gravity axes do not lie in the same vertical plane but are located at opposite sides of the central or gravity axis of said structure and the bottoms of which vessels are at an angle to each other, a machine support, knife edges carried by said support on which said structure can rock, said knife edges being located in the central or gravity axis of said structure, means for supplying the weighing vessels of said structure with liquid alternately, and means for alternately emptying the vessels of said structure at the completion of each weighing operation.

4. In a weighing machine for liquids, a structure comprising two weighing vessels arranged side by side but displaced laterally in relation to each other so that the central or gravity axes do not lie in the same vertical plane but are located at opposite sides of the central or gravity axis of said structure and the bottoms of which vessels are at an angle to each other, a machine support, knife edges carried by said support on which said structure can rock, said knife edges being located in te central or gravity axis of said structure, weights arranged at the front and rear of said structure adapted to counterbalance the additional weight of that part of each vessel of said structure which projects farthest over said knife edges, means for supplying the weighing vessels of said structure with liquid alternately, and means for alternately emptying the vessels of said structure at the completion of each weighing operation.

5. In a weighing machine for liquids, a structure comprising two weighing vessels arranged side by side but displaced laterally in relation to each other so that the central or gravity axes do not lie in the same vertical plane but are located at opposite sides of the central or gravity axis of said structure and the bottoms of which vessels are at an angle to each other, a machine support, knife edges carried by said support on which said structure can rock, said knife edges being located in the central or gravity axis of said structure, adjustable weights arranged at the front and rear of said structure adapted to counterbalance the additional weight of that part of each vessel of said structure which projects farthest over said knife edges, means for supplying the weighing vessels of said structure with liquid alternately, and means for alternately emptying the vessels of said structure at the completion of each weighing operation.

6. In a weighing machine for liquids, a structure comprising two weighing vessels arranged side by side but displaced laterally in relation to each other so that the central or gravity axes do not lie in the same vertical plane but are located at opposite sides of the central or gravity axis of said structure and the bottoms of which vessels are at an angle to each other, a machine support, knife edges carried by said support on which said structure can rock, said knife edges being located in the central or gravity axis of said structure, means for supplying the weighing vessels of said structure with liquid alternately, for each vessel of said structure a discharge valve, and means adapted to open said valves when said structure rocks about said knife edges at the completion of weighing operations.

7. In a weighing machine for liquids, a structure comprising two weighing vessels arranged side by side but displaced laterally in relation to each other so that the central or gravity axes do not lie in the same vertical plane but are located at opposite sides of the central or gravity axis of said structure and the bottoms of which vessels are at an angle to each other, a machine support, knife edges carried by said support on which said structure can rock, said knife edges being located in the central or gravity axis of said structure, means for supplying the weighing vessels of said structure with liquid alternately, discharge valves in the bottoms of the vessels of said structure, adapted to close by their own weight, downwardly extending stems on said valves, and adjustable stops carried by said machine support on which said valve stems rest when the said structure rocks about said knife edges.

8. In a weighing machine for liquids, a structure comprising two weighing vessels arranged side by side but displaced laterally in relation to each other so that the central or gravity axes do not lie in the same vertical plane but are located at opposite sides of the central or gravity axis of said structure and the bottoms of which vessels are at an angle to each other, a machine support, knife edges carried by said support on which said structure can rock, said knife edges being located in the central or gravity axis of said structure, buffer devices against which said structure bears when it rocks about said knife edges, means for supplying the weighing vessels of said structure with liquid alternately, and means for alternately emptying the vessels of said structure at the completion of each weighing operation.

9. In a weighing machine for liquids, a structure comprising two weighing vessels arranged side by side but displaced laterally in relation to each other so that the central or gravity axes do not lie in the same vertical plane but are located at opposite sides of the central or gravity axis of said structure and the bottoms of which vessels are at an angle to each other, a machine support, knife edges carried by said support on which said structure can rock, said knife edges being located in the central or gravity axis of said structure, buffer devices against which said structure bears when it rocks about said knife edges, means for moving said buffer devices out of operative positions while the vessels of said structure are discharging, means for moving said buffer devices into operative positions while said vessels are receiving liquid, means for supplying the weighing vessels of said structure with liquid alternately, and means for alternately emptying the vessels of said structure at the completion of each weighing operation.

10. In a weighing machine for liquids a structure comprising two weighing vessels, a machine support, knife edges on said support on which said vessels can rock, means for supplying said vessels alternately with liquid, means for emptying said vessels alternately as said vessels rock about said knife edges, for each said vessel a tank adapted to receive the contents of said vessel, floats in said tanks, levers connected to said floats, elastically mounted buffer heads carried by said levers, that are in positions to support said vessels when said floats are down and are out of such positions when said floats are raised by liquid within said tanks, and pivots on which levers can turn.

11. In a weighing machine for liquids a structure comprising two weighing vessels, a machine support, knife edges on said support on which said vessels can rock, means for supplying said vessels alternately with liquid, discharge valves in the bottom of said vessels, means for opening said valves as said vessels rock about said knife edges, for each said vessel a tank adapted to receive the contents of said vessel and formed with a discharge opening the cross sectional area of which is less than that of the openings controlled by the said discharge valves, floats in said tanks, levers connected to said floats, elastically mounted buffer heads carried by said levers, that are in position to support said vessels when said floats are down and are out of such positions when said floats are raised by liquid within said tanks, and pivots on which levers can turn.

12. In a weighing machine for liquids a structure comprising two weighing vessels, a machine support, knife edges on said support on which said vessels can rock, means for supplying said vessels alternately with liquid, stops on said vessels, buffer devices against which said vessels bear through said stops when rocked about said knife edges, means for moving said stops clear of said buffer devices while said vessels are discharging their contents, and means for emptying said vessels alternately as said vessels rock about said knife edges.

13. In a weighing machine for liquids a structure comprising two weighing vessels, a machine support, knife edges on said support on which said vessels can rock, means for supplying said vessels alternately with liquid, stops on said vessels, buffer devices against which said vessels bear through said stops when rocked about said knife edges, levers pivoted to said vessels and carrying said stops, floats within said vessels connected to said levers, and means for emptying said vessels alternately as said vessels rock about said knife edges.

14. In a weighing machine for liquids a structure comprising two weighing vessels, a machine support, knife edges on said support on which said vessels can rock, means for supplying said vessels alternately with liquid, stops on said vessels, buffer devices against which said vessels bear through said stops when rocked about said knife edges, means for moving said stops clear of said buffer devices while said vessels are discharging their contents, means for moving said buffer devices out of operative positions while said vessels are discharging their contents, and means for emptying said vessels alternately as said vessels rock about said knife edges.

15. In a weighing machine for liquids, a structure comprising two weighing vessels arranged side by side but displaced laterally in relation to each other so that the central or gravity axes do not lie in the same vertical plane but are located at opposite sides of the central or gravity axis of said structure and the bottoms of which vessels are at an angle to each other, a machine support, knife edges carried by said support on which said structure can rock, said knife edge being located in the central or gravity axis of said structure, a pivoted spout through which the vessels of said structure are supplied with liquid, means for moving said spout from over one vessel of said structure to over the other vessel of said structure as said structure rocks about said knife edges, and means for alternately emptying the vessels of said structure at the completion of each weighing operation.

16. In a weighing machine for liquids, a structure comprising two weighing vessels arranged side by side but displaced laterally in relation to each other so that the central or gravity axes do not lie in the same vertical plane but are located at opposite sides of the central or gravity axis of said structure and the bottoms of which vessels are at an angle to each other, a machine support, knife edges carried by said support on which said structure can rock, said knife edges being located in the central or gravity axis of said structure, a spout through which the vessels of said structure are supplied with liquid, a rotary spindle on which said spout is fixed, an arm fixed on said spindle, a part on said struceure that engages said arm and moves it as said structure rocks about such knife edges, and means for alternately emptying the vessels of said structure at the completion of each weighing operation.

17. In a weighing machine for liquids a structure comprising two weighing vessels, a machine support, knife edges on said support on which said vessel can rock, means for supplying said vessels alternately with liquid, means for emptying said vessels alternately as said vessels rock about said knife edges, tanks into which liquid from said vessels is alternately delivered and from which the liquid flows away, floats located in said tanks, and counting mechanism operated by said floats adapted to register the number of weighing operations.

18. In a weighing machine for liquids, a structure comprising two weighing vessels arranged side by side but displaced laterally in relation to each other so that the central or gravity axes do not lie in the same vertical plane but are located at opposite sides of the central or gravity axis of said structure and the bottoms of which vessels are at an angle to each other such that when the one is inclined for discharging the other is horizontal, a machine support, knife edges carried by said support on which said structure can rock, said knife edges being located in the central or gravity axis of said structure, means for supplying the weighing vessels of said structure with liquid alternately, and means for alternately emptying the vessels of said structure at the completion of each weighing operation.

In testimony whereof I have hereunto set my hand in presence of two subscribing witnesses.

GERARD LOUIS COCHIUS.

Witnesses:
THEODOOR JOSEPH ARON
TACOMETTI ELEURICHSSOON.
FRANS DAVID COCHIUS.